(12) United States Patent
Kaufmann et al.

(10) Patent No.: US 12,476,272 B2
(45) Date of Patent: Nov. 18, 2025

(54) BATTERY FOR AN AT LEAST PARTIALLY ELECTRICALLY OPERABLE MOTOR VEHICLE HAVING AT LEAST ONE FLEXIBLE TENSIONING DEVICE WHICH IS SUPPORTED ON A MOTOR VEHICLE COMPONENT, AND MOTOR VEHICLE

(71) Applicant: Daimler AG, Stuttgart (DE)

(72) Inventors: Rainer Kaufmann, Stuttgart (DE); Thomas Soczka-Guth, Schelkingen (DE); Ulrich Beck, Erdmannhausen (DE); Anselm Muelberger, Wernau (DE); Jens Meintschel, Bernsdorf (DE)

(73) Assignee: Daimler AG, Stuttgart (DE)

( * ) Notice: Subject to any disclaimer, the term of this patent is extended or adjusted under 35 U.S.C. 154(b) by 863 days.

(21) Appl. No.: 17/627,349

(22) PCT Filed: Jul. 8, 2020

(86) PCT No.: PCT/EP2020/069175
§ 371 (c)(1),
(2) Date: Jan. 14, 2022

(87) PCT Pub. No.: WO2021/008952
PCT Pub. Date: Jan. 21, 2021

(65) Prior Publication Data
US 2022/0271326 A1    Aug. 25, 2022

(30) Foreign Application Priority Data

Jul. 15, 2019    (DE) ..................... 10 2019 004 928.4

(51) Int. Cl.
*H01M 10/04*    (2006.01)
*B60L 50/64*    (2019.01)
(Continued)

(52) U.S. Cl.
CPC ......... *H01M 10/0481* (2013.01); *B60L 50/64* (2019.02); *B60L 58/12* (2019.02);
(Continued)

(58) Field of Classification Search
CPC ......... H01M 10/0481; H01M 10/0468; H01M 10/428; H01M 10/482; H01M 2220/20; H01M 2010/4271; H01M 50/249
See application file for complete search history.

(56) References Cited

U.S. PATENT DOCUMENTS 8,465,866 B2    6/2013 Kim
9,123,972 B2 *  9/2015 Giroud .................. H01G 11/62
2015/0134172 A1  5/2015 Ose et al.

FOREIGN PATENT DOCUMENTS

CN          104638310 A      5/2015
DE    10 2009 035 482 A1    2/2011
(Continued)

OTHER PUBLICATIONS

CN110611063 translation (Year: 2019).*
(Continued)

*Primary Examiner* — Jane J Rhee
(74) *Attorney, Agent, or Firm* — Crowell & Moring LLP

(57) ABSTRACT

A battery includes a plurality of battery cells, where each of the battery cells has a first volume in a discharged state of the battery cell and a second volume which is different from the first volume in a charged state of the battery cell. A predetermined force is exertable on the plurality of battery cells by a flexible tensioning device in the discharged state and in the charged state. The flexible tensioning device is configured such that, in order to exert the predetermined force on the plurality of battery cells, the flexible tensioning device is supportable on a motor vehicle component of a motor vehicle.

14 Claims, 2 Drawing Sheets

(51) Int. Cl.
  *B60L 58/12* (2019.01)
  *H01M 10/42* (2006.01)
  *H01M 10/48* (2006.01)
  *H01M 50/249* (2021.01)

(52) U.S. Cl.
  CPC ..... *H01M 10/0468* (2013.01); *H01M 10/425* (2013.01); *H01M 10/482* (2013.01); *H01M 50/249* (2021.01); *H01M 2010/4271* (2013.01); *H01M 2220/20* (2013.01)

(56) References Cited

FOREIGN PATENT DOCUMENTS

| | | | |
|---|---|---|---|
| DE | 10 2014 225 367 A1 | 6/2016 | |
| DE | 10 2015 216 221 A1 | 3/2017 | |
| DE | 10 2017 119 467 A1 | 2/2019 | |
| GB | 2568957 A * | 6/2019 | .......... H01M 10/482 |
| JP | 2843888 B2 | 11/1990 | |
| JP | 2015-95281 A | 5/2015 | |
| JP | 2015-527691 A | 9/2015 | |
| JP | 2017-103083 A | 6/2017 | |
| KR | 10-2011-0117586 A | 10/2011 | |
| WO | WO 2013/188094 A1 | 12/2013 | |
| WO | WO 2019/003772 A1 | 1/2019 | |

OTHER PUBLICATIONS

DE102014225367 translation (Year: 2016).*
Korean-language Korean Office Action issued in Korean Application No. 10-2021-7043198 dated Dec. 12, 2023 (6 pages).
Chinese-language Chinese Office Action issued in Chinese Application No. 202080052225.5 dated Oct. 20, 2023, with partial English translation (15 pages).
Japanese Office Action (Notification of Reasons for Refusal) issued in Japanese application No. 2021-576174 dated Dec. 6, 2022, with English translation (Nine (9) pages).
Japanese Notification of Reasons for Refusal issued in Japanese application No. 2021-576174 dated Dec. 6, 2022, with English language translation (Nine (9) pages).
PCT/EP2020/069175, International Search Report dated Oct. 23, 2020 (Two (2) pages).
German-language German Office Action issued in German application No. 10 2019 004 928.4 dated Jul. 2, 2020 (Seven (7) pages).

* cited by examiner

BATTERY FOR AN AT LEAST PARTIALLY ELECTRICALLY OPERABLE MOTOR VEHICLE HAVING AT LEAST ONE FLEXIBLE TENSIONING DEVICE WHICH IS SUPPORTED ON A MOTOR VEHICLE COMPONENT, AND MOTOR VEHICLE

BACKGROUND AND SUMMARY OF THE INVENTION

The invention relates to a battery, in particular a solid-state battery for an at least partially electrically operable motor vehicle, having a plurality of battery cells, wherein each of the battery cells has a first volume in a discharged state of the battery cell and a second volume which is different from the first volume in a charged state of the battery cell, and having at least one flexible tensioning device for exerting a predetermined force on the plurality of battery cells in the discharged state and in the charged state. Furthermore, the invention relates to a motor vehicle having a battery, in particular a solid-state battery.

It is known from the prior art that solid-state batteries, which can also be referred to as solid-body batteries and have, for example, a lithium-metal anode and a silicon anode, have a large volume change over the corresponding charging state, the so-called state of charge (SOC). Furthermore, these solid-state batteries can have cell thickness growth over their lifetime, so-called state of health (SOH). During operation of the solid-state battery, in particular during charging or discharging of the solid-state battery, it is provided that an at least substantially constant pressure must be applied to the battery cell surface. Due to the change in cell volume, the voltage taps of the battery cells shift relative to the battery housing.

DE 10 2009 035 482 A1 discloses a battery having a plurality of individual battery cells. These are designed to be flat and are braced between at least two end plates to form a cell stack. Means are provided to subject the cell stack to a pressure load in the stacking direction.

Furthermore, DE 10 2015 216 221 A1 discloses a storage module for a vehicle. The storage module comprises a plurality of plate-shaped electrical storage cells arranged upright next to each other in a longitudinal direction of the storage module. Furthermore, the storage module comprises a housing which encloses the plurality of plate-shaped storage cells in the longitudinal direction on at least two opposite sides and which is designed in such a way that it can absorb tensile forces in the longitudinal direction and stiffens the storage module against deflection transversely to the longitudinal direction. The housing comprises at least partially a vehicle underbody of the vehicle in which the storage module is to be installed. In addition, the storage module comprises two pressure plates which are arranged at longitudinally opposite ends of the storage module and which are configured to compress the plurality of plate-shaped electrical storage cells in co-operation with the housing.

Furthermore, the operation of a battery arrangement including one or more rechargeable battery cells is known from WO 2013/188094 A1. Monitoring one or more operating parameters of the battery cells takes place. Dynamic control of the pressure applied to the one or more battery cells is performed based at least in part on one or more of the monitored operating parameters.

The object of present invention is to provide a battery, in particular a solid-state battery, and a motor vehicle, by means of which improved operation of the motor vehicle is made possible.

One aspect of the invention relates to a battery, in particular a solid-state battery for an at least partially electrically operable motor vehicle, having a plurality of battery cells, wherein each of the battery cells has a first volume in a discharged state of the battery cell and a second volume different from the first volume in a charged state of the battery cell, and having at least one first flexible tensioning device for exerting a predetermined force on the plurality of battery cells in the discharged state and in the charged state.

It is provided that the at least first flexible tensioning device is designed in such a way that, in order to exert the predetermined force on the plurality of battery cells, the at least first flexible tensioning device is supported at least on one motor vehicle component of the motor vehicle.

In particular, it is thus provided that the flexible tensioning device is supported on the at least one motor vehicle component in the installed state of the battery. This enables the battery to be provided with a reduced number of components, since a component already installed in the motor vehicle can be used to support the tensioning device. By way of example, a motor vehicle floor or a floor panel of the motor vehicle can be used as a motor vehicle component.

The predetermined force is to be understood in particular as a substantially constant force. In other words, a constant force is exerted on the battery cells by means of the flexible tensioning device. In particular, due to the change in volume during the charging state of the battery cells, the constant force is nevertheless maintained. In particular, it is provided that, in the charged state of the battery cell, the battery cell has a larger volume than in the discharged state.

In particular, it can be provided, for example, that the predetermined force is set in such a way that a constant pressure of 0.1 to 0.5 millipascals is exerted on a cell surface of the battery cells.

In particular, it is thereby enabled according to the invention that the battery can be modularised to enable a user of the motor vehicle to adjust the solid-state battery to their driving cycle. In particular, a required range can be set as a driving cycle. Furthermore, the ability to be modularised can be implemented between different vehicle classes.

In particular, it is thus according to the invention a continuously modularizable battery for at least partially electric motor vehicles. The battery cells or battery modules, which in turn can consist of a plurality of different battery cells, are lined up, in particular upright, in the longitudinal direction of the motor vehicle. Only as many battery cells as desired by the user can be installed. The number of battery cells can be increased at any time, for example if the maximum capacity has not yet been reached. At the end of the battery cell row or the battery module row, the flexible tensioning device can be inserted at certain intervals. This can be removed again without great effort, for example to insert new battery cells or new battery modules and thus be able to expand the battery capacity of the battery or, for example, to replace damaged elements. The tensioning device can thus exert a substantially constant pressure or force on the cell or battery module.

In particular, the battery is integrated in the motor vehicle and, for example, standing on the main base of the vehicle or hanging under the main base of the vehicle, such that the battery itself does not have an extra base, but rather the base of the motor vehicle is provided as the base. In particular, the complete structural integration, in particular the rigidity of the solid-state battery, is provided by the motor vehicle.

The battery cells are lined up next to each other, in particular in the longitudinal direction of the motor vehicle. The battery cells or battery modules are lined up by at least two battery cells. The battery cells or battery modules stand between the longitudinal motor vehicle boundary and the transverse vehicle boundary of the battery of the tensioning device, which can be anchored continuously in the battery housing or can hold its position in another way. By way of example, an anchoring can be implemented by a screw or plug-in connection. The flexible tensioning device is designed in such a way that it can be moved in the longitudinal vehicle direction for the purpose of changing the battery capacity. This flexible tensioning device is designed in such a way that it can also be removed and, for example, reinstalled at another location within the battery. This makes it possible to increase the battery capacity or to replace damaged battery cells.

In total, this thus makes it possible to install the solid-state battery in a plurality of different motor vehicles. A cost saving can be implemented, and a user of the motor vehicle can continuously select the capacity of the battery. In particular, this makes it possible to save weight in the motor vehicle.

According to an advantageous embodiment, the battery has a first battery module having a first number of battery cells and a separate second battery module having a second number of battery cells, wherein the first battery module has a first flexible tensioning device and the second battery module has a second flexible tensioning device, and wherein the first flexible tensioning device and the second flexible tensioning device are supported on the motor vehicle component in the installed state in the motor vehicle. In other words, it is provided that the battery comprises at least two battery modules, which in turn are formed from a plurality of battery cells. This makes it possible to increase the battery capacity within the battery. By each of the battery modules having a separate flexible tensioning device, the predetermined force can be applied to the respective battery module. In particular, the volume change from the charged state of the respective battery module to the discharged state of the respective battery module can reliably compensate for this volume change. In particular, it can be provided that the first flexible tensioning device and the second flexible tensioning device are supported on the same motor vehicle component. By way of example, this can be a cross-bracing within the motor vehicle, in particular a cross-bracing on the motor vehicle floor. This enables the constant force to be exerted on the battery cells with fewer components.

It has also proved advantageous if, when the battery is installed in the motor vehicle, at least two housing walls of the battery are formed as motor vehicle components. In other words, the battery can be installed in the motor vehicle in such a way that the battery has no solid-state battery housing. In particular, the housing is provided by different motor vehicle components. In other words, the components of the battery are supported on the motor vehicle components. In this way, the solid-state battery can be provided in a weight-reduced manner.

It is also advantageous if the at least first flexible tensioning device is designed in such a way that the predetermined force can be regulated. In other words, it can be provided that the predetermined force can be adjusted. In particular, this has the advantage that, for example, a different predetermined force has to be exerted on the battery cells in the course of the lifetime of the battery. Due to the controllability of the predetermined force, an improved operation of the battery, also over its lifetime, can thus be implemented.

In a further advantageous embodiment, the battery has an electronic computing device which is designed to control the predetermined force depending on a decision criterion. In particular, the electronic computing device has corresponding circuits and lines in order to be able to generate control signals. In particular, the electronic computing device can thus regulate the predetermined force automatically and in response to the current state of charge. This enables improved operation of the battery.

It is further advantageous if the electronic computing device regulates the predetermined force depending on a detected current charging state of the plurality of battery cells and/or depending on a detected pressure value within the battery as a decision criterion. In particular, it can be provided for this purpose that the battery has, for example, corresponding voltage sensors, by means of which the charging state of the plurality of battery cells or of a respective battery cell can be determined, whereby the force can be set accordingly depending on the detected charging state. Alternatively or additionally, it is possible that a pressure sensor is installed inside the battery, which measures the internal pressure inside the battery and adjusts or regulates the at least one flexible tensioning device according to this detected pressure value. In other words, it is provided that the required pressure to be applied, in particular the predetermined force value, is determined by corresponding sensors or derivatives of the state of charge of the battery cells and is permanently set such that the battery cells experience a constant pressure over their respective area and the volume change can take place, or that a constant pressure also acts on the cell during the volume change. The pressure or the tension is adjusted in such a way that one side of the cell sequence is supported by a respective housing wall or the vehicle structure behind it. This enables improved operation of the battery within the motor vehicle.

According to a further advantageous design, the battery, in particular the solid-state battery, has at least one busbar on which the plurality of battery cells is moveably arranged. In particular, it can be provided that the battery cells are either designed as hardcase cells or as pouch cells. The voltage tap occurs via corresponding terminals which slide over the current conducting rail, in other words the busbar, and can thus also move during the cell displacement due to the change in volume. This means that there is no corresponding mechanical stress on the arresters when the battery cells are displaced due to their change in volume. The busbar is pressed against the cell arresters by springs, for example, to ensure contact. The arrangement of the cell arresters and busbar can occur either laterally or on an upper or lower side of the battery cells. This enables improved operation of the battery.

It is also advantageous if the at least first flexible tensioning device is designed as a hydraulic tensioning device. In particular, the pressure is applied by a fluid. In the flexible tensioning device, the fluid can then compensate for the expansion of the battery cells, in particular in the longitudinal direction. By way of example, for this purpose, the volume change and the predetermined force can be implemented by a cushion or a cylinder as a hydraulic element.

Furthermore, it has proved advantageous if the at least first flexible tensioning device is designed as a pneumatic tensioning device. In particular, with pneumatics, the corresponding predetermined force or pressure is applied by a gas and, for example, is compensated in the flexible tensioning device by a cushion or by a cylinder for the change in expansion in the longitudinal direction of the vehicle. This is in particular a preferred variant of the flexible tensioning device.

In a further advantageous embodiment, the at least first flexible tensioning device is designed as a spring-based tensioning device. In other words, the predetermined force is exerted on the battery cells by means of a spring force. In particular, a respective spring element of the flexible tensioning device is then supported on the at least one motor vehicle component in order to be able to exert the predetermined force on the battery cells. This enables improved operation of the battery with little effort.

Alternatively, the predetermined force can be implemented, for example, by means of clamping mats arranged between the battery cells and the flexible tensioning device. Alternatively again, the pressure can be applied, for example, via elastic synthetic material components or rubber components, in particular via superelastic rubbers, wherein the elastic rubber components are in particular correspondingly deformable. Again alternatively or additionally, the predetermined force can be applied to the battery cells by appropriate foams within the flexible tensioning device.

In a further advantageous embodiment, the at least first flexible tensioning device is designed as an electrical tensioning device. In particular, an electrical displacement can thereby be driven by, for example, a control motor, which then in turn displaces the flexible tensioning device as a whole, and in particular the control motor is then supported on the motor vehicle component, for example by a threaded rod. Alternatively or additionally, the constant force can be built up internally by a cylinder or the displacement of a wall of the flexible tensioning device.

In an advantageous design, the electrical tensioning device is self-locking, in particular a threaded spindle of the electrical tensioning device is self-locking. This makes it possible to reliably exert the predetermined force on the battery cells, wherein the self-locking design enables the force to be maintained with reduced energy usage.

According to a further advantageous design, the at least first flexible tensioning device is designed as a plastic- or rubber-based tensioning device. This can be implemented, for example, by means of elastic plastic components or rubber components, in particular superelastic rubbers, wherein the elastic rubber components are in particular correspondingly deformable. In this way, the predetermined force can be applied to the battery cells simply and yet reliably.

In particular, it can be provided, should the battery have at least two flexible tensioning devices, in particular a plurality of flexible tensioning devices, that the flexible tensioning devices are preferably of the same design, but it is also possible that the respective tensioning devices are designed differently from one another. By way of example, the first flexible tensioning device can be designed as an electrical tensioning device, wherein a second flexible tensioning device can be designed as a pneumatic tensioning device. This list is purely exemplary and is by no means to be regarded as conclusive, and merely serves to illustrate this embodiment.

Another further aspect of the invention relates to a motor vehicle having a battery according to the preceding aspect, and having at least one motor vehicle component, wherein an at least first flexible tensioning device of the battery is supported on the motor vehicle component. In particular, the motor vehicle is designed as a passenger car.

Further advantages, features and details of the invention emerge from the following description of preferred exemplary embodiments and from the drawings. The features and combinations of features mentioned above in the description, as well as the features and combinations of features mentioned below in the description of figures and/or shown alone in the figures, can be used not only in the combination indicated in each case, but also in other combinations or on their own, without departing from the scope of the invention.

DETAILED DESCRIPTION OF THE DRAWINGS

Figure 1:
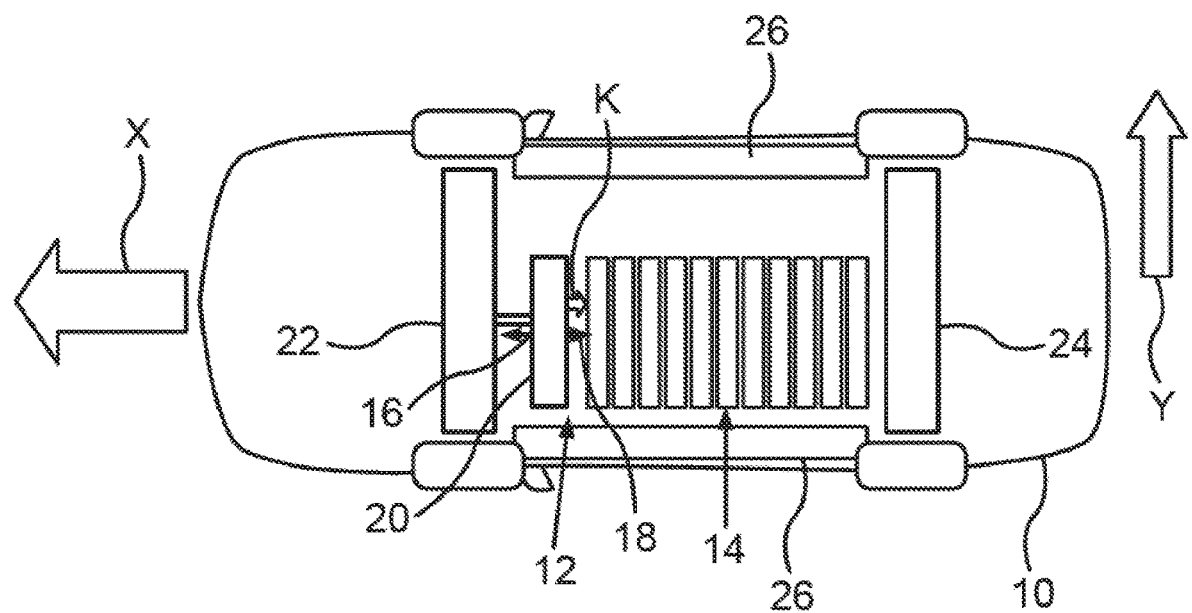
FIG. 1 is a schematic plan view of an embodiment of a motor vehicle having a battery.

In the figures, identical or functionally identical elements are provided with identical reference numerals.

FIG. 1 shows a schematic plan view of an embodiment of a motor vehicle 10 having an embodiment of a battery 12. The battery 12, which can in particular be a solid-state battery, is designed in particular for the motor vehicle 10 which is at least partially electrically operable. The battery 12 has a plurality of battery cells 14. Each of the battery cells 14 has a first volume in a discharged state of the battery cell 14 and a second volume different from the first volume in a charged state of the battery cell 14. This change in volume is shown in particular by the arrows 16 and 18 in FIG. 1. In particular, an increase in volume is represented by the first arrow 16 and a decrease in volume is represented by the second arrow 18. In particular, a respective battery cell 14 is larger in the charged state, i.e., has a larger volume, than in the discharged state.

The battery 12 further has a flexible tensioning device 20 for exerting a predetermined force K on the plurality of battery cells 14 in the discharged state and in the charged state.

It is provided that the at least first flexible tensioning device 20 is designed such that, for exerting the predetermined force K on the plurality of battery cells 14, the at least first flexible tensioning device 20 is supported on at least one motor vehicle component 22 of the motor vehicle 10. In other words, the motor vehicle component 22 is a structuring element. In the present exemplary embodiment, the structuring element can be, for example, a cross-bracing or axle of the motor vehicle 10. In particular, FIG. 1 shows that when the battery 12 is installed in the motor vehicle 10, at least two housing walls of the battery 12 are formed as motor vehicle components 22, 24. In the present exemplary embodiment, for example, the battery 12, or the battery cells 14, is supported as a housing wall on the second motor vehicle component 24, which in the present case can also be designed as an axle, for example as the rear axle of the motor vehicle 10. Furthermore, a corresponding housing wall for the battery 12 can be formed by sills 26 of the motor vehicle 10.

FIG. 1 shows in particular the motor vehicle 10, which is located in a main driving direction of the motor vehicle 10. The arrow X indicates in particular the longitudinal direction of the motor vehicle 10 and in particular the main direction of travel of the motor vehicle 10. The arrow Y indicates in particular a transverse motor vehicle direction of the motor vehicle 10.

Figure 2:
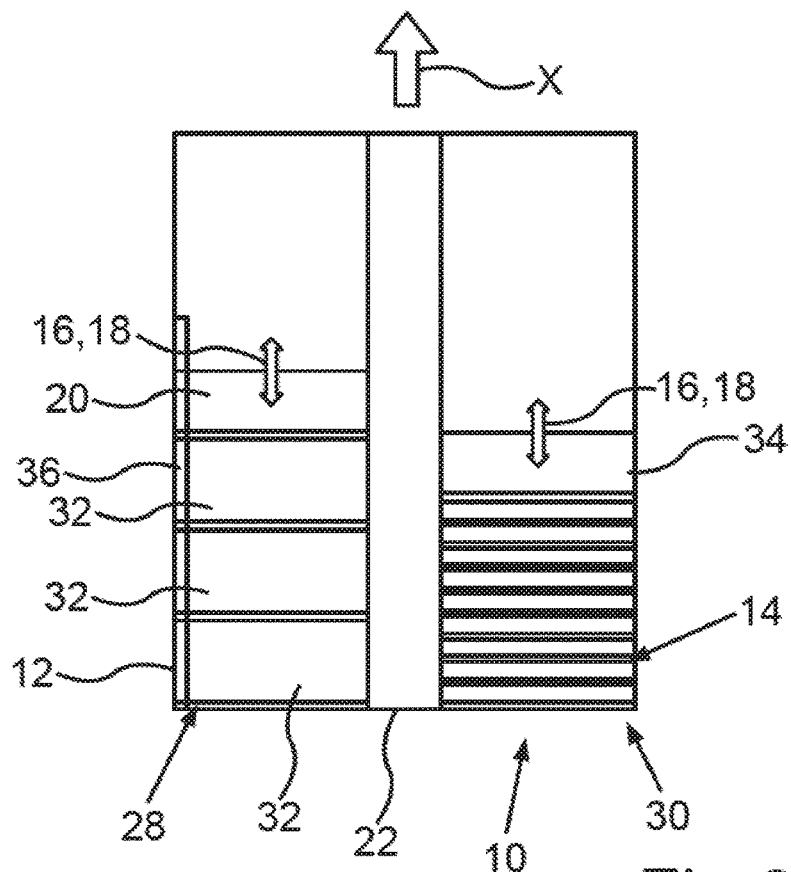
FIG. 2 is a further schematic plan view of an embodiment of the motor vehicle having a further embodiment of a battery.

FIG. 2 shows a schematic plan view of a further embodiment of the motor vehicle 10 having an embodiment of the battery 12. In the following exemplary embodiment, the battery 12 has a first battery module 28 having a first number of battery cells 14 and a separate second battery module 30 having a second number of battery cells 14. In the present exemplary embodiment, the first battery module 28 is formed by three battery sub-modules 32, wherein each of the battery sub-modules 32 comprises the battery cells 14. The second battery module 30 is formed by only the battery cells 14 in the present example. In particular, this shows that the battery 12 is modular and can be adapted to a user's request, in particular with respect to the battery capacity. Furthermore, FIG. 2 shows that the first battery module 28 has the first flexible tensioning device 20, and the second battery module 30 has, in the present exemplary embodiment, a second flexible tensioning device 34. It is provided that the first flexible tensioning device 20 and the second flexible tensioning device 34 are supported on the motor vehicle component 22 in the installed state in the motor vehicle 10.

Furthermore, FIG. 2 shows that the battery 12 has at least one busbar 36 on which the plurality of battery cells 14, in the present exemplary embodiment the battery sub-modules 32, are moveably arranged.

Figure 3:
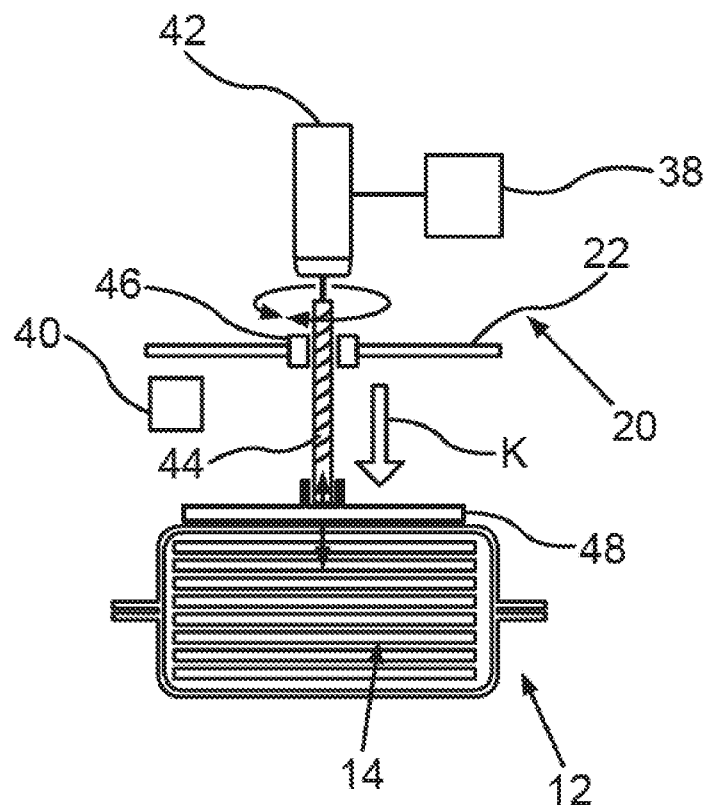
FIG. 3 is a schematic side view of an embodiment of a battery.

FIG. 3 shows a schematic side view of an embodiment of the battery 12. In the present exemplary embodiment, it is shown in particular that the at least first flexible tensioning device 20 is designed in such a way that the predetermined force K can be regulated. By way of example, it can be provided for this purpose that the battery 12 has an electronic computing device 38 which is designed to regulate the predetermined force K depending on a decision criterion. The electronic computing device 38 can in turn regulate the predetermined force K depending on a detected current charging state of the plurality of battery cells 14 and/or depending on a detected pressure value within the battery 12 as a decision criterion. For this purpose, it can be provided, for example, that a corresponding detection device 40 is arranged for detecting the pressure or the charging state within the battery 12.

In particular, FIG. 3 shows that the at least first flexible tensioning device is designed as an electrical tensioning device. For this purpose, in the present exemplary embodiment, the electrical tensioning device has an electric motor 42 via which a spindle 44 can be driven. In particular, a thread 46 is arranged on the motor vehicle component 22 such that, by rotating the spindle 44, the force K can be exerted on a pressure plate 48, which in turn distributes the force K constantly to the battery cells 14.

As an alternative to the electrical tensioning device, the flexible tensioning device 20, 34 can also be provided as a spring-based tensioning device or as a plastic- or rubber-based tensioning device.

In particular, the tensioning devices 20, 34 enable the thickness of the battery cells 14 to change due to charging, discharging or ageing. For this purpose, for example, the flat pressure plate 48 can be actively moved forwards or backwards in accordance with the change in thickness, such that it results in a constant axial compression. In particular, the at least first flexible tensioning device 20 has an actively controlled constant force system having a preferably horizontal force-displacement curve to compensate for the thickness change.

In other words, the force K in the present exemplary embodiment is executed electro-mechanically. The kinetic energy is preferably generated by the electric motor 42 and introduced, for example, via the gear rack or via the spindle 44 directly via ramp or lever systems having a transmission ratio into the pressure plate 48. In order to avoid having to apply holding energy, the spindle 44 is self-locking in variants with a spindle. For variants with a gear rack, a currentless active locking or brake is provided. In order to prevent constant readjustment of the disc system, it can again be useful to additionally arrange an elastic element such as a thin tension mat between the battery modules 28, 30 and the pressure plate 48.

Due to the horizontal force-displacement curve of the flexible tensioning device 20, 34 in particular, only the necessary minimum pre-tensioning force is ever applied, such that the battery cell 14 or the battery modules 28, 30 or the battery sub-modules 32 can be configured to be lighter as well as more cost- and space-efficient. Since the electrode stack is always compressed with the predetermined force K, cell performance and service life are not negatively affected. The active control of the predetermined force K also makes it possible to vary it in a targeted manner depending on the operating state. By way of example, the force K could be reduced to 0 during transport, during idle operation or in the event of danger, for example in the event of a vehicle crash. The flexible tensioning device 20, 34 can be installed once in the battery cell 14 or in the battery module 28, 30 or several times. If a corresponding flexible tensioning device 20, 34 is arranged in the battery module 28, 30 after each battery cell 14, then the battery cells 14 remain the same in their axial position despite the change in thickness.

As an alternative to what is shown in FIG. 3, the electrically operated flexible tensioning device 20 can be provided, for example, by means of the electric motor 42, a spindle 44 and a ramp system. Alternatively, it can further be provided that the electrically operated flexible tensioning device 20 can be provided by means of an electric motor 42, the spindle 44 and a lever system.

Figure 4:
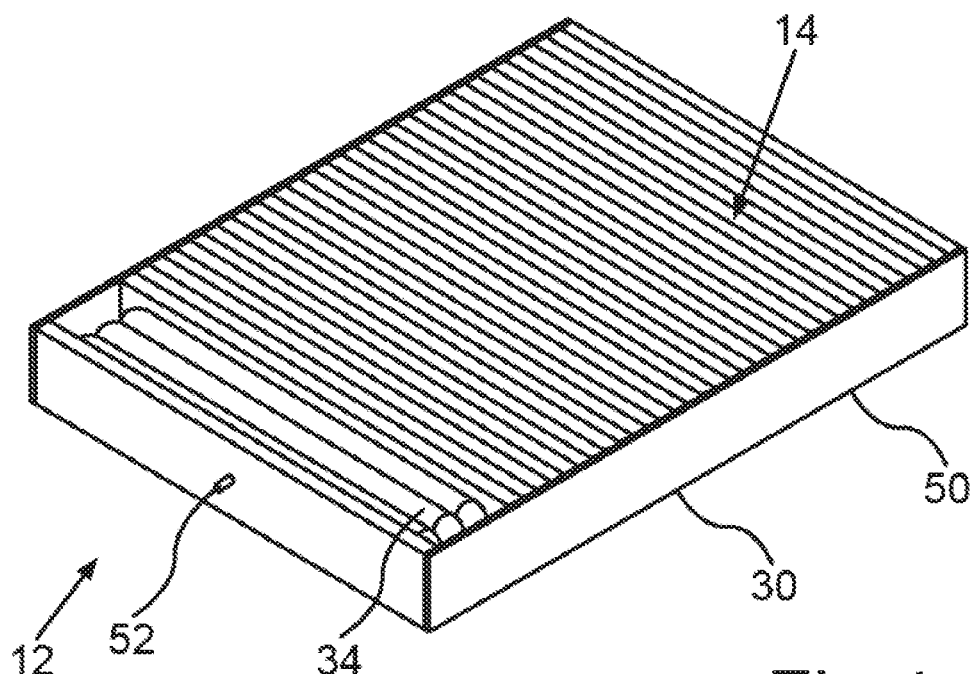
FIG. 4 is a schematic perspective view of a further embodiment of the battery.

FIG. 4 shows a schematic perspective view of a further embodiment of the battery 12. In particular, FIG. 4 shows, for example, the embodiment of the second battery module 30 according to FIG. 2. In the following exemplary embodiment, the second flexible tensioning device 34 is designed as a pneumatic tensioning device. Alternatively, the flexible tensioning devices 20, 34 can also be designed as hydraulic tensioning devices. In the present exemplary embodiment, the second flexible tensioning device 34 is shown. An analogous exemplary embodiment applies to the first flexible tensioning device 20. The embodiment of the flexible tensioning device 20, 34 as a pneumatic flexible tensioning device is a preferred exemplary embodiment. The second battery module 30 has a plurality of battery cells 14, which can be formed by means of solid-state chemistry, for example. The pneumatic actuator is designed according to the bellows principle with, in the present exemplary embodiment, three connected air chambers connected in series. To ensure the rectangular shape, the chamber walls are made of plastic or rubber, for example, and are glued or vulcanised to metal support plates on the front side. Due to the flat design of the front sides of the pneumatic actuator, no force-distributing pressure plate needs to be arranged between the actuator and electrode stack. The pneumatic actuator and electrode stack are inserted into a metal housing 50 which is closed on all sides and whose front side wall is thickened in the direction of the pre-tensioning force, in particular with the predetermined force K, and is supported directly on the motor vehicle component 20, for example. The compressed air supply 52 to the bellows takes place by means of an electrically driven compressor and via control valves. In order to maintain the required pressure over a longer period of time even without operation of the compressor, a storage tank can be arranged in the pneumatic system. The additional effort required for appropriately designed battery cells 14 or battery modules 28, 30 is significantly reduced if the motor vehicle 10 is already equipped with an air suspension system that has its own compressor.

In one design of the invention, the at least first flexible tensioning device (20) is designed in such a way that, in order to exert the predetermined force (K) on the plurality of battery cells (14), the at least first flexible tensioning device (20) is supported at least on an inner side of the battery housing or on a cell housing.

Alternatively, the tensioning device according to the invention can be installed not only in a battery or a cell block, but also within an individual battery cell. In this case, the pressure is applied in the cell block to cells with an elastic housing or in the cell directly to the electrodes.

LIST OF REFERENCE CHARACTERS 10 motor vehicle
12 solid-state battery
14 battery cell
16 arrow
18 arrow
20 first flexible tensioning device
22 first motor vehicle component
22 second motor vehicle component
26 sill
28 first battery module
30 second battery module
32 battery sub-module
34 second flexible tensioning device
36 busbar
38 electronic computing device
40 detection device
42 electric motor
44 spindle
46 thread
48 pressure plate
50 housing
52 compressed air supply
K predetermined force
X longitudinal motor vehicle direction
Y transverse motor vehicle direction

The invention claimed is:

1. A battery, comprising:
a first plurality of battery cells, wherein each of the battery cells has a first volume in a discharged state of the battery cell and a second volume which is different from the first volume in a charged state of the battery cell; and
a first flexible tensioning device, wherein a predetermined force is exertable on the first plurality of battery cells by the first flexible tensioning device in the discharged state and in the charged state,
wherein the battery has no solid-state battery housing and when the battery is installed in a motor vehicle a housing for the battery is formed by a plurality of motor vehicle components of the motor vehicle,
wherein the first flexible tensioning device is configured such that, in order to exert the predetermined force on the first plurality of battery cells, when the battery is installed in the motor vehicle, the first flexible tensioning device is supported on one of the plurality of motor vehicle components of the motor vehicle that form the housing for the battery.

2. The battery according to claim 1, wherein a first battery module has the first plurality of battery cells, wherein a separate second battery module has a second plurality of battery cells, wherein the first battery module has the first flexible tensioning device, wherein the second battery module has a second flexible tensioning device, and wherein the first flexible tensioning device and the second flexible tensioning device are supported on the one of the plurality of motor vehicle components of the motor vehicle that form the housing for the battery.

3. The battery according to claim 1, wherein the plurality of motor vehicle components of the motor vehicle that form the housing for the battery includes a cross-bracing or an axle of the motor vehicle and sills of the motor vehicle.

4. The battery according to claim 1, wherein the first flexible tensioning device is configured such that the predetermined force is adjustable.

5. The battery according to claim 4, further comprising an electronic computing device which is configured to regulate the predetermined force depending on a decision criterion.

6. The battery according to claim 5, wherein the electronic computing device regulates the predetermined force depending on a detected current charging state of the first plurality of battery cells and/or depending on a detected pressure value within the battery, as the decision criterion.

7. The battery according to claim 1, further comprising a busbar on which the first plurality of battery cells is moveably disposed.

8. The battery according to claim 1, wherein the first flexible tensioning device is a hydraulic tensioning device.

9. The battery according to claim 1, wherein the first flexible tensioning device is a pneumatic tensioning device.

10. The battery according to claim 1, wherein the first flexible tensioning device is a spring-based tensioning device.

11. The battery according to claim 1, wherein the first flexible tensioning device is an electric tensioning device.

12. The battery according to claim 11, wherein a spindle of the electrical tensioning device is self-locking.

13. The battery according to claim 1, wherein the first flexible tensioning device is a plastic-based or rubber-based tensioning device.

14. A motor vehicle, comprising:
the battery according to claim 1; and
a plurality of motor vehicle components, wherein a housing for the battery is formed by the plurality of motor vehicle components and wherein the first flexible tensioning device of the battery is supported on one of the plurality of motor vehicle components that form the housing for the battery.

* * * * *